US 6,661,126 B2

(12) United States Patent
Rudy

(10) Patent No.: US 6,661,126 B2
(45) Date of Patent: Dec. 9, 2003

(54) LINEAR GUIDE

(75) Inventor: Dietmar Rudy, Kaiserslautern (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 09/931,491

(22) Filed: Aug. 16, 2001

(65) Prior Publication Data

US 2002/0089238 A1 Jul. 11, 2002

(30) Foreign Application Priority Data

Aug. 16, 2000 (DE) .......................... 100 39 915
Aug. 16, 2000 (DE) .......................... 100 39 916

(51) Int. Cl.[7] ............................................. H02K 41/02
(52) U.S. Cl. ........................................................ 310/12
(58) Field of Search ............................ 310/12, 13, 14; 318/135

(56) References Cited

U.S. PATENT DOCUMENTS

| | | | | |
|---|---|---|---|---|
| 3,612,642 A | * | 10/1971 | Dostal ........................ 359/201 |
| 3,981,441 A | * | 9/1976 | Walters ....................... 235/103 |
| 4,041,672 A | * | 8/1977 | Gularte ........................ 53/399 |
| 4,152,594 A | * | 5/1979 | Schunck et al. ............. 250/343 |
| 4,654,571 A | * | 3/1987 | Hinds .......................... 318/687 |
| 5,298,122 A | * | 3/1994 | Munch et al. ............... 162/259 |
| 5,740,489 A | * | 4/1998 | Vanooteghem et al. ..... 396/617 |
| 5,945,754 A | * | 8/1999 | Fulwood et al. ............. 310/74 |
| 6,011,374 A | * | 1/2000 | Ulbrich ....................... 318/569 |
| 6,134,981 A | * | 10/2000 | Novak et al. ............. 74/490.09 |
| 6,163,970 A | * | 12/2000 | Nelle et al. .................... 33/482 |

FOREIGN PATENT DOCUMENTS

| | | |
|---|---|---|
| DE | 3526932 A1 | 1/1987 |
| DE | 4439233 A1 | 7/1995 |
| DE | 19708894 A1 | 10/1998 |
| DE | 19842384 A1 | 3/2000 |
| EP | 0742072 A2 | 11/1995 |

* cited by examiner

Primary Examiner—Nestor Ramirez
Assistant Examiner—Judson H. Jones
(74) Attorney, Agent, or Firm—Volpe and Koenig, P.C.

(57) ABSTRACT

A linear guide with a guide rail (25), on which a guide carriage (26) is supported for movement longitudinally, and with a drive to cause the longitudinal movement of the guide carriage (26), which is constructed as an electric motor with a motor component arranged on the guide rail (25) and a motor element arranged on the guide carriage (26). A distance-measuring system is allocated to the linear guide, which has a measuring strip and a measuring head (30) which is movable in relation to the measuring strip adjacent to the guide carriage (26) or the guide rail (25) extending parallel to the guide rail (25). The distance-measuring system is assigned an acceleration sensor operating with an eddy current sheet and an exciter block (28) partially surrounding it.

14 Claims, 5 Drawing Sheets

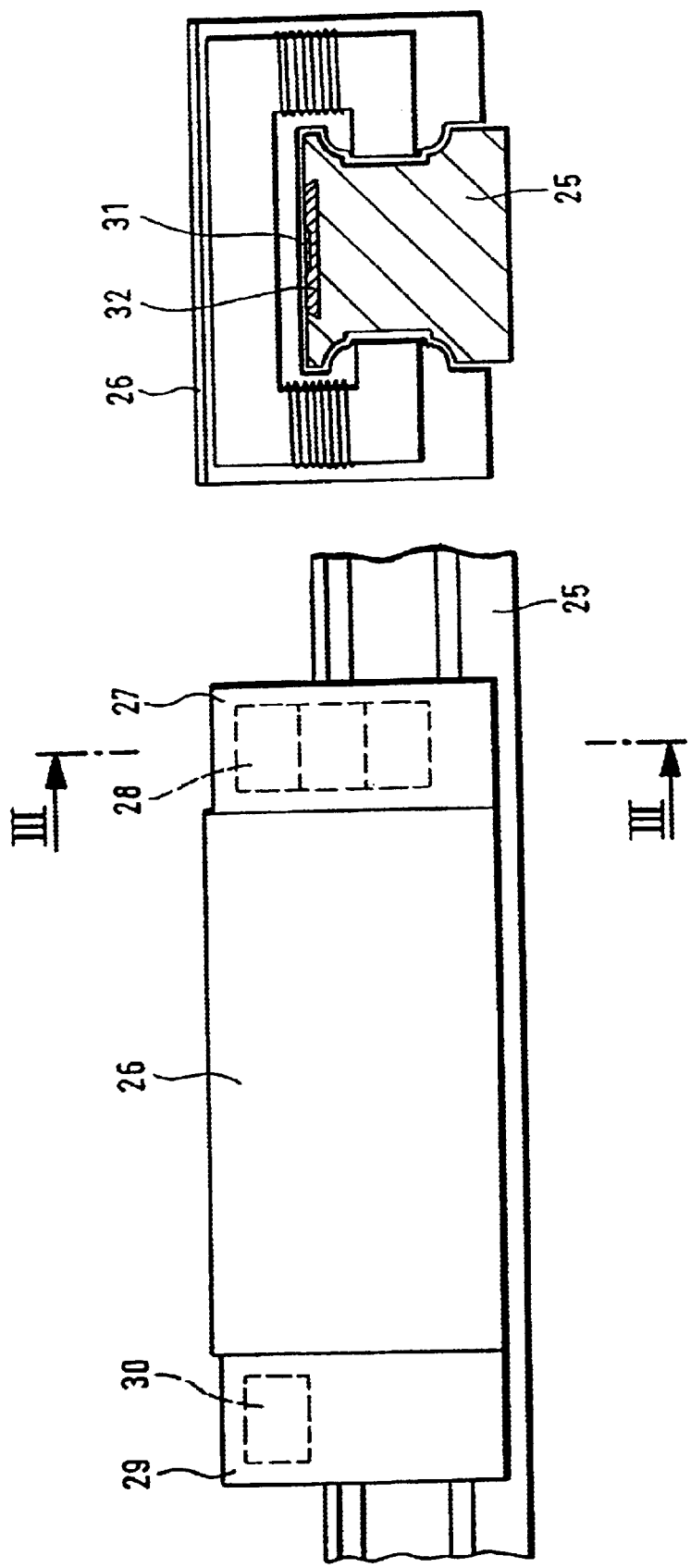

LINEAR GUIDE

BACKGROUND

The invention concerns a linear guide with a guide rail on which a guide carriage is supported for movement longitudinally, and with a drive causing longitudinal motion of the guide carriage which is constructed as an electric motor with a motor element arranged on the guide rail and with a motor element arranged on the guide carriage, as well as a distance-measuring system assigned to the linear guide which has a measuring strip adjacent to the guide carriage or the guide rail running parallel to the guide rail, and a measuring head movable relative to this.

Moreover the invention concerns a linear guide with a guide rail arranged in a guide housing on which a traveling carriage is supported for movement longitudinally, and with a drive causing the longitudinal motion of the traveling carriage which is constructed as an electric motor with a motor element arranged on the guide rail and a motor element arranged on the traveling carriage as well as with a distance-measuring system assigned to the linear guide.

A linear guide with a distance-measuring system is also known from the publication WO 91 16 594. With the device described there, a measuring strip is installed in the material of an elongated carrier which is inserted into a rectangular groove of a guide rail and fastened by gluing. On a guide carriage movable along the guide rail, a measuring head is arranged such that it is adjacent to the measuring strip.

Publication DE 198 42 384 A1 shows a linear guide of the type mentioned at the beginning where the guide reals and the guide carriage are arranged in a guide housing constructed as a beam. The electric drive with the motor component of the guide rail and the motor component of the guide carriage is situated in this so that it forms a linear motor.

For regulation of a linear motor, using high resolution optical measuring systems is known. These are sensitive to dirt and represent a high cost factor. Magnetic or inductive linear measuring systems are also known as economical linear measuring systems. These cannot be so high resolution as, for example, optical linear measuring systems due to physical conditions. Especially with linear motors, the speed signal necessary for regulation must be calculated or differentiated on the basis of the linear measuring system. If the resolution of the system is not high enough, then the entire drive becomes unsteady and therewith unusable.

SUMMARY

Underlying the invention is the object of creating an improved, economical linear guide which is less sensitive toward dirt accumulation.

This objective is accomplished in accordance with the invention in that the distance-measuring system is assigned an acceleration sensor operating with an eddy current sheet and an exciter block surrounding this. In this way, obtaining a speed signal can be realized though the acceleration sensor. The latter can be a sensor operating according to the Ferraris principle whereby the eddy current sheet consists of a non-magnetizable metal sheet and the exciter block contains permanent magnets. A Ferraris sensor only measures the relative acceleration between two structural components moving in relation to each other. It is possible with these sensors to operate a linear motor with a low resolution but economical magnetic or inductive linear measurement system. By integration of a linear measurement sensor and a Ferraris acceleration sensor in a mounting channel guide, the advantages emerge that no additional structural space is necessary, that a diminution of the installation expenditure and costs savings take place, and that an interchangeability of linear measurement systems becomes possible.

The function of the eddy current sheet can be assumed by the guide rail, and this can be made of an anti-magnetic hardenable roller bearing element. A non-magnetizable metal material can also be used as an eddy current sheet which is installed in an elongated groove of the guide rails.

The exciter block can be constructed U-shaped and be arranged in a separate housing which is fastened to the guide carriage. Here the housing for the exciter block can be arranged in a face of the guide carriage pointing in the direction of motion. Moreover, the measuring head of the distance-measuring system can be arranged in a housing which is likewise fastened to the guide carriage on a face pointing in the direction of travel.

According to a further proposal, the objective is accomplished in accordance with the invention in that the distance-measuring system is assigned an acceleration sensor with an eddy current sheet and an exciter block operating according to the Ferraris principle, whereby the eddy current sheet consists of an electrically conducting non-magnetizable material and the exciter block contains permanent magnets. In this way, obtaining a speed signal can be realized through the acceleration sensor. The eddy current sheet can form part of a cable channel for a drag chain of the beam U-shaped in cross section. This results in the advantage that with a linear guide with a cable channel for a control device containing the acceleration sensor, no additional structural space is necessary, and that in this way costs can be saved in installing the linear guide.

The beam can be fastened on a long side of the guide housing. The exciter block can be constructed U-shaped in cross section, and the eddy current sheet can be partially surrounded by the exciter block. This can be held by a driver strap which is fastened on a long side of the traveling carriage. Aluminum or copper, for example, come into consideration as an electrically conducting, non-magnetizable material for the eddy current sheet.

BRIEF DESCRIPTION OF THE DRAWINGS

Preferred embodiments of the invention are shown in the drawings, and are described in greater detail in comparison with a linear motor according to the known state of the art. In the drawings:

FIG. 2 is a side view of a linear guide in accordance with the invention;

FIG. 3 is a cross sectional view through the linear guide of FIG. 2 taken along line III—III of FIG. 2;

DETAILED DESCRIPTION OF PREFERRED EMBODIMENTS

Figure 4:
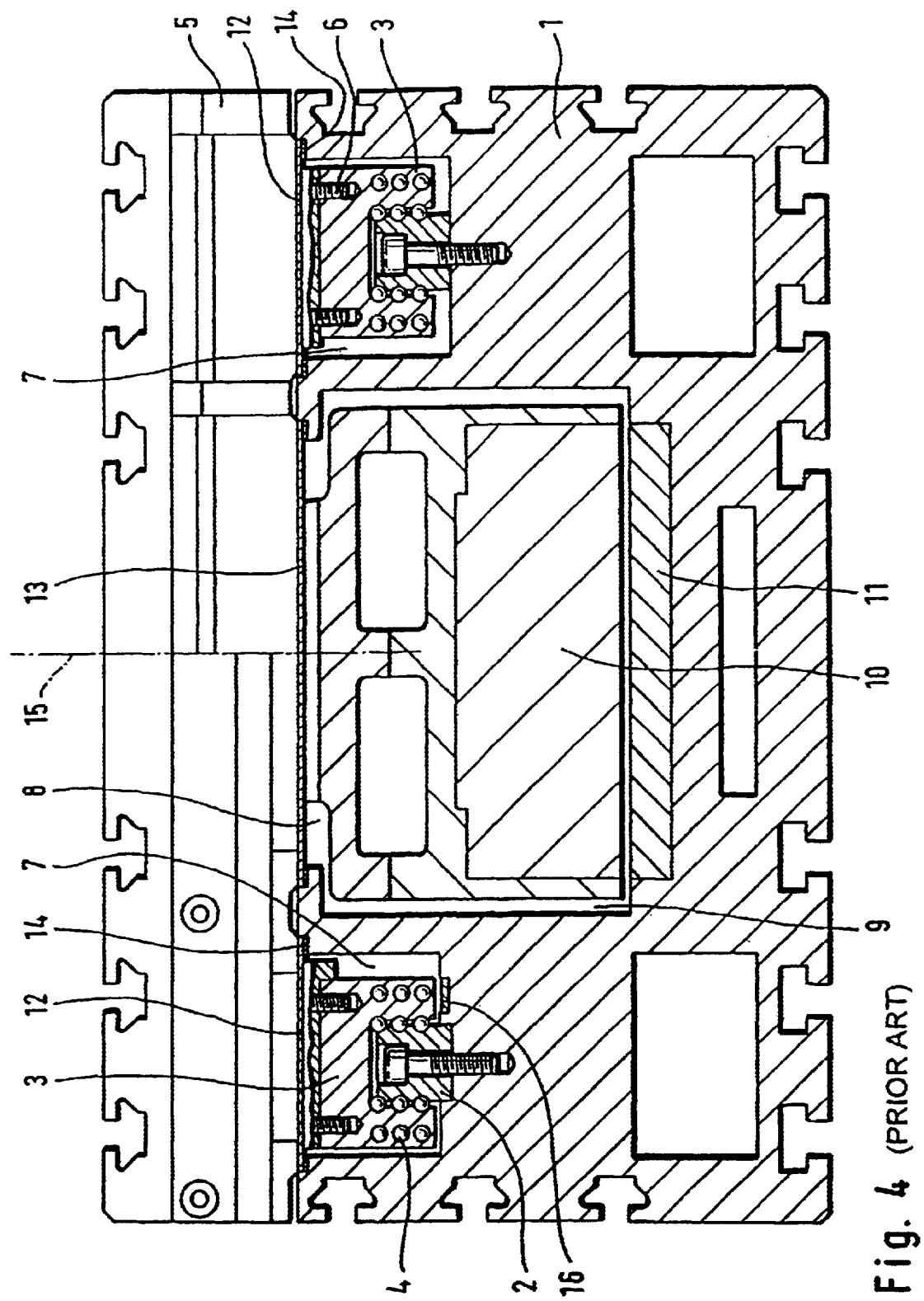
FIG. 4 is a cross sectional view of a previously known linear guide with two guide rails arranged in a guide housing for two guide carriages.

A previously known linear guide is shown in FIG. 4 and includes a guide housing 1 with an approximately U-shaped cross section which can be constructed as an aluminum beam. Two parallel guide rails 2 are fastened in the housing 1 on which, in any given case, at least one guide carriage 3 is supported through recirculating ball bearings 4. With the aid of the supporting balls of these recirculating ball bearings 4, the guide carriages 3 are movable along the guide rails 2.

The guide carriages 3 serve here for the movable mounting of a traveling carriage 5. This is attached with screws 6 on the upper sides of the guide carriages 3 which face away from the guide rails 2. The traveling carriage 5 is situated on the exterior of guide housing 1 and projects through two lateral elongated openings 7 and a central elongated opening 8 into the guide housing 1 to be able to be connected with the guide carriages 3 and to be able to be connected in a central receiving space 9 of the guide housing 1 with a motor primary element 10 of a drive. Opposite the motor primary element 10 on traveling carriage 5 lies a motor secondary element 11 which is fastened in the guide housing 1. These two elements form an electric drive motor for moving the traveling carriage 5 in the longitudinal direction of the guide housing 1. With such a drive containing the motor primary element 10 and motor secondary element 11, the linear guide is constructed as a linear motor.

The lateral elongated openings 7 are closed off outside the traveling carriage 5 in any given case with a cover band 12, while a cover band 13 is provided for the central elongated opening 8. The cover bands 12 and 13 are arranged in a fixed manner on the guide housing 1 in the longitudinal direction of guide rails 2. They are passed through slot-like openings of the traveling carriage 5 so that it, during its motion in the longitudinal direction of the guide housing 1, executes a movement relative to cover bands 12 and 13. With the aid of permanent magnet strips 14 which are arranged in elongated grooves of guide housing 1, the cover bands 12 and 13 are held outside the traveling carriage 5 to guide housing 1. The linear guide in accordance with FIG. 4 is constructed symmetrically with relation to a vertical central plane 15. It is provided with a measuring strip 16 for measuring distances which is located in the section interior of guide housing 1, runs parallel to guide rails 2 and is adjacent to one of guide carriages 3. The measuring strip 16 is part of a distance-measuring system.

Figure 1:
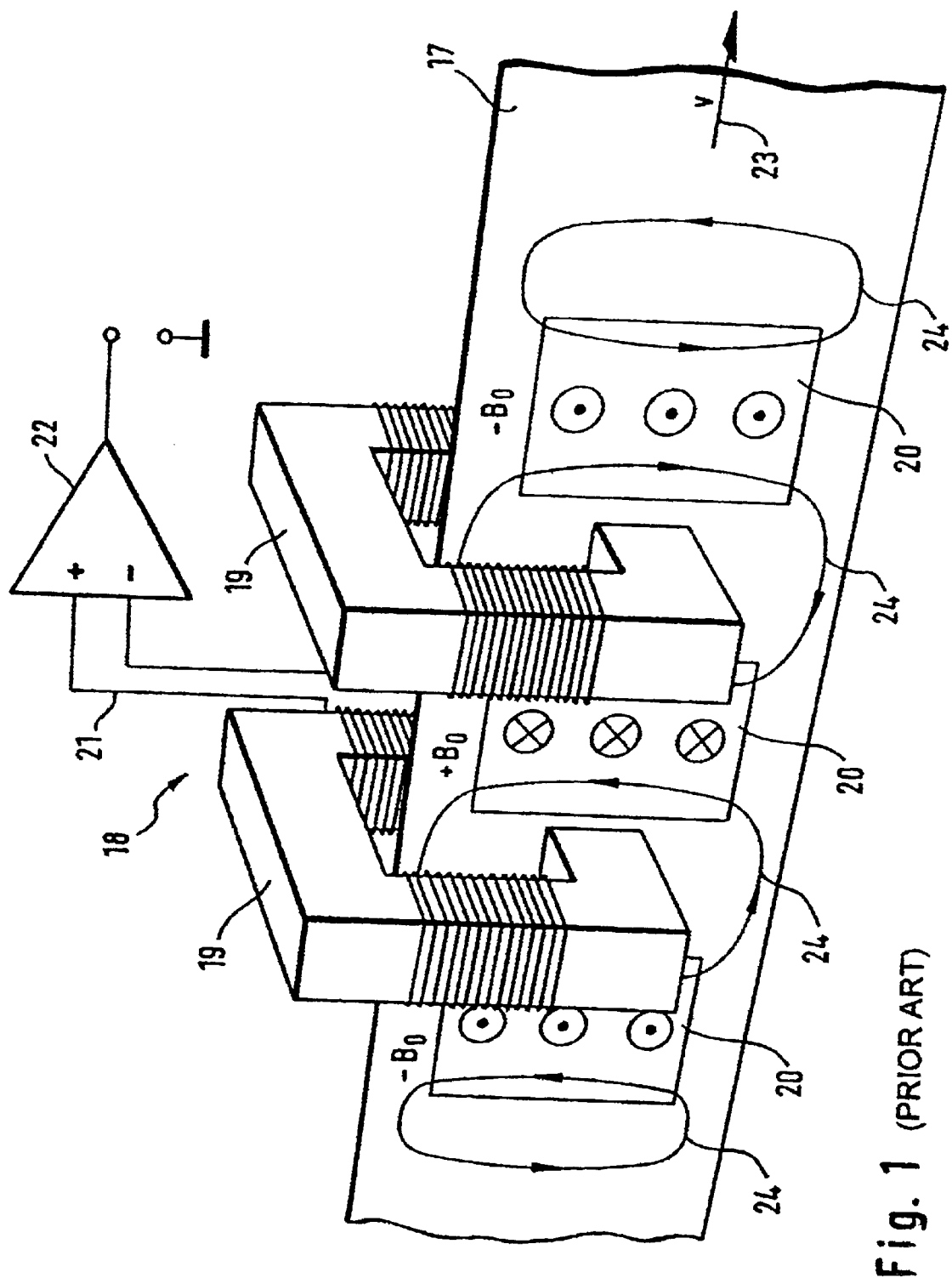
FIG. 1 shows a perspective view of the main construction of a Ferraris acceleration sensor.

On the basis of FIG. 1, the principle according to which an acceleration sensor used in accordance with the invention operates is explained as follows: A strip-like eddy current sheet 17, which is made of a non-magnetizable metal, is partially surrounded by an exciter block 18 which is formed by two approximately U-shaped measurement receivers 19. The two measurement receivers 19 are arranged one behind the other in the longitudinal direction of the eddy current sheet 17. Moreover, permanent magnets are located in the exciter block 18. The U legs of the measurement receivers 19 are in any given case surrounded by coils of electrical wire 21 which lead to an amplifier 22. If now the eddy current sheet 17 is moved in its longitudinal direction, indicated by arrow 23, at a speed v along the measurement receivers 19, the permanent magnets induce electrical voltage as a consequence of the permanent magnetic fields 20 in the eddy current sheet 17 which there engender eddy currents. These once again generate an electrical current on the coils of the measurement receivers 19 dependent upon the change in speed of the eddy current sheet 17 in the time unit (dv/dt), thus upon acceleration, which are increased by the amplifier 22 and used for control purposes.

A linear guide of the invention represented in FIGS. 2 and 3 contains a guide rail 25 made of anti-magnetic hardenable roller bearing steel which is partially surrounded by a guide carriage 26. On one face of the guide carriage 26, which points in the long direction of guide rail 25, a housing 27 is arranged. This is provided for an exciter block 28 of an acceleration sensor. On the other face of the guide carriage 26, there is a housing 29 for a measuring head 30 of a distance-measuring system. A measuring strip 31 of the distance-measuring system is fastened on the guide rail 25 in that it is borne by a cover band 32. This is installed in an elongated groove on the guide rail 25. The elongated groove is situated on the upper side of the guide rail 25 facing the measuring head 30.

Figure 7:
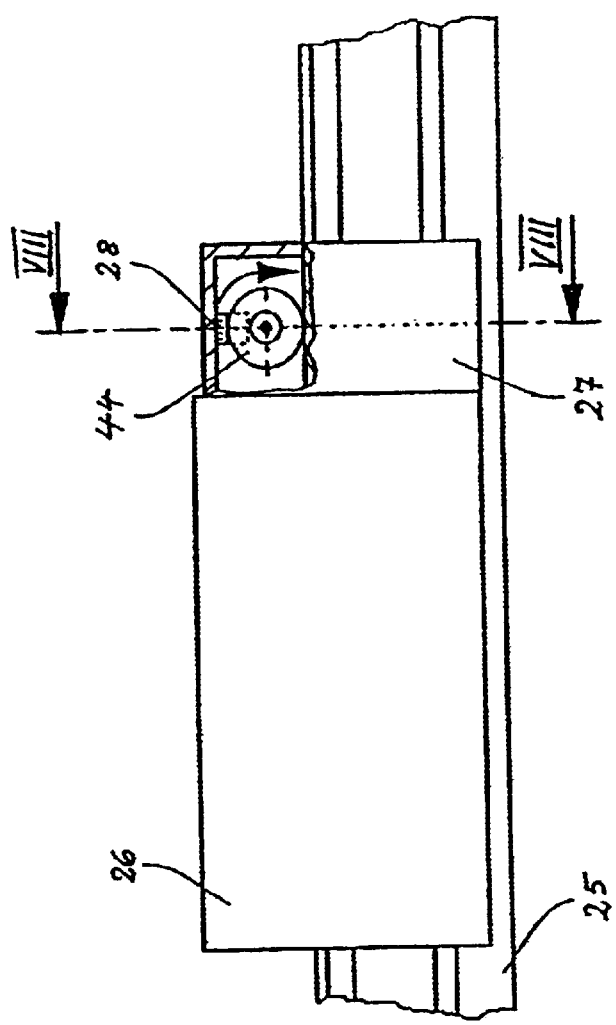
FIG. 7 is a side view of a third embodiment of a linear guide in accordance with the invention.
Figure 8:
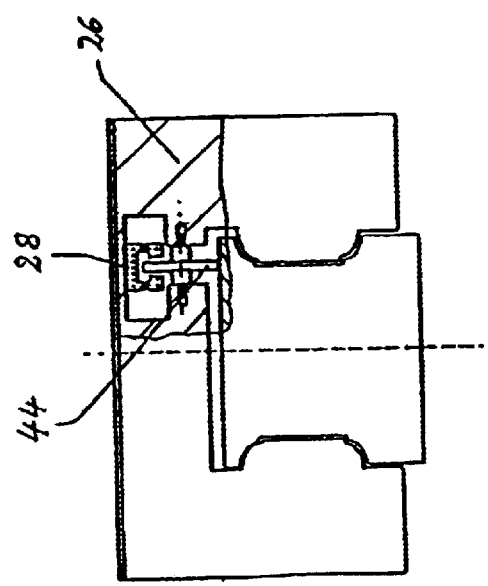
FIG. 8 is a cross-sectional view through the linear guide of FIG. 7 taken along line VII—VII.

As shown in FIGS. 7 and 8, it is also possible for a rotating disk 44 to function as an eddy current sheet and to be driven by the guide rail 25 by friction. In this way, such a rotary Ferraris sensor is made usable for a linear guide.

Figure 5:
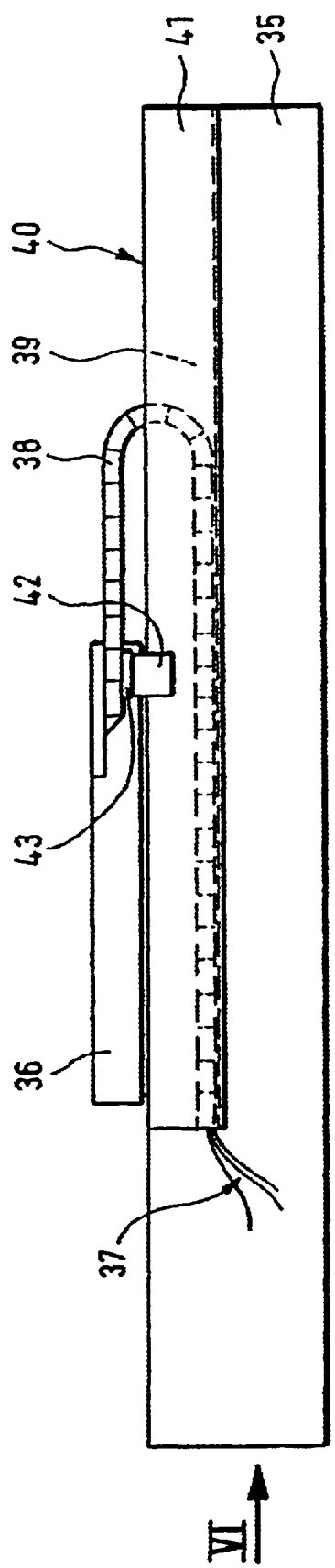
FIG. 5 is a side view of another linear guide in accordance with the invention.
Figure 6:
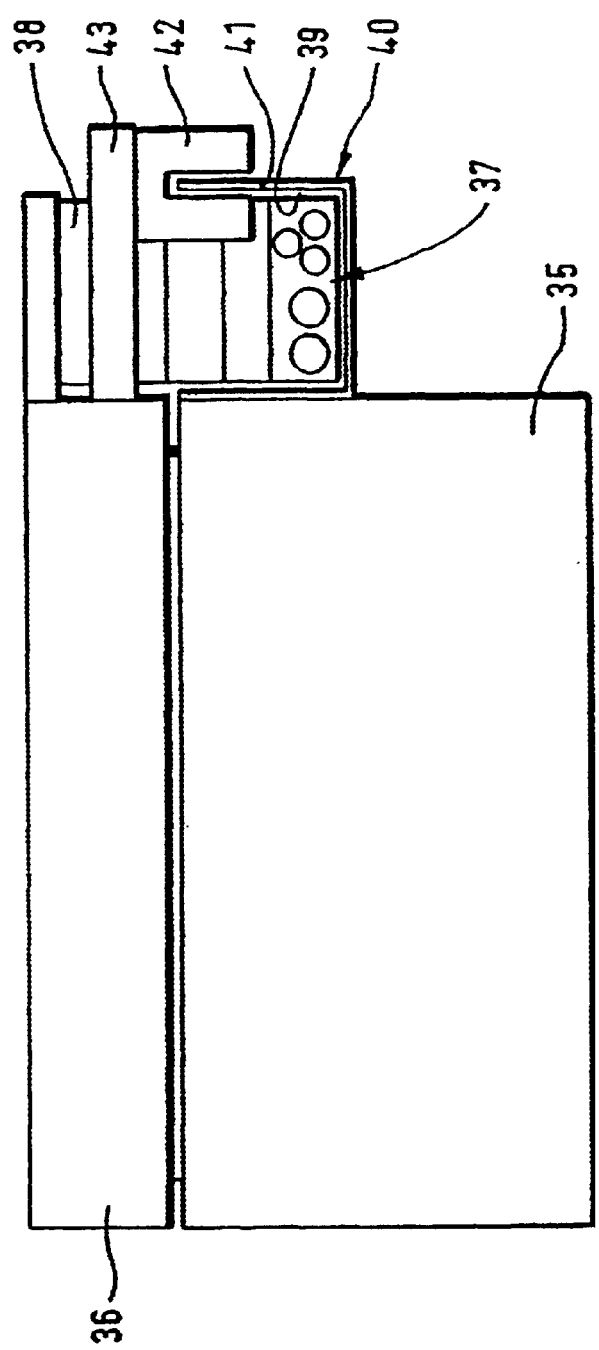
FIG. 6 is an enlarged front side view of the linear guide of FIG. 5 taken in the direction of arrow VI in FIG. 5.

FIGS. 5 and 6 depict a linear guide of the invention which is also designated as a module. It contains a longitudinally extending guide housing 35 from which a traveling carriage 36 projects on the upper side. This is supported on guide rails and is also designated as a mobile slide. The guide rails are arranged within the guide housing 35 parallel to this.

This linear guide designated as a module is driven by a linear motor which likewise is situated in the guide housing 35. From the outside, one recognizes in this module merely the mobile slide or traveling carriage 36 and guide housing 35. Since when using a linear motor, electrical drive components such as, for example, a current-conducting primary element of the motor and a linear measuring system are situated in the mobile slides, cables must be capable of being passed out of the slides. This takes place in the usual manner with a drag chain for cable.

In this embodiment, a drag chain 38 for the cables 37 leading to the traveling carriages 36 is arranged in a cable channel 39. The cable channel 39 is formed by a beam 40 with a U-shaped cross section which is fastened on a longitudinal side of the guide housing 35.

In accordance with the invention, a U leg of the beam 40 is used as eddy current sheet 41 for a Ferraris sensor. Therefore the beam consists of an electrically conducting non-magnetizable material, such as, for example, aluminum or copper. Moreover, an exciter block 42 is provided for the Ferraris sensor. This is constructed U-shaped in cross section and partially encloses the eddy current sheet 41.

While beam 40 and with it the eddy current sheet 41 are fastened to guide housing 35, the exciter block 42 is held by a driver strap 43 which is attached on the longitudinal side of the traveling carriage 38 adjacent to the beam 40. This arrangement makes it possible for the exciter block 42 to move along the eddy current sheet 41 when the slide or traveling carriage 36 is driven along the guide housing 35 relative to this.

REFERENCE NUMBER LIST

1 Guide housing
2 Guide rail
3 Guide carriage
4 Recirculating ball bearing
5 Traveling carriage
6 Screw
7 Lateral elongated opening 8 Central elongated opening
9 Central receiver space
10 Motor primary element
11 Motor secondary element
12 Cover band
13 Cover band
14 Permanent magnet strip
15 Central plane
16 Distance-measuring strip
17 Eddy current sheet
18 Exciter block
19 Measurement receiver
20 Permanent magnetic field
21 Electrical wire
22 Amplifier
23 Arrow
24 Eddy current
25 Guide rail
26 Guide carriage
27 Housing for the exciter block
28 Exciter block
29 Housing for the measuring head
30 Measuring head
31 Measuring strip
32 Cover strip
35 Guide housing
36 Traveling carriage
37 Cable
38 Drag chain
39 Cable channel
40 Beam
41 Eddy current sheet
42 Exciter block
43 Driver strap
44 Disk
V Speed

What is claimed is:

1. Linear guide comprising a guide rail (25) on which a guide carriage (26) is supported for movement longitudinally, and a drive to cause the longitudinal movement of the guide carriage (26), the drive being formed as an electric motor with a first motor element arranged on the guide rail (25) and a second motor element arranged on the guide carriage (26), and a distance-measuring system on the linear guide, which includes a measuring strip (31) and a measuring head (30) movable relative to the measuring strip adjacent to the guide carriage (26) or the guide rail (25) and extending parallel to the guide rail (25), wherein the distance-measuring system includes an acceleration sensor having an eddy current sheet and an exciter block (28) surrounding at least a portion thereof, the acceleration sensor is a sensor operating according to the Ferraris principle, and the eddy current sheet is formed of a non-magnetizable metal, and the eddy current sheet function is performed by the guide rail (25).

2. Linear guide according to claim 1, wherein the exciter block includes permanent magnets.

3. Linear guide according to claim 1, wherein the guide rail is manufactured of an anti-magnetic hardenable roller bearing steel.

4. Linear guide according to claim 1, wherein a cover band (32) of a non-magnetic material is used as the eddy current sheet which is installed in an elongated groove of the guide rail (25).

5. Linear guide according to claim 1, wherein the exciter block (28) is constructed U-shaped and is arranged in a separate housing (27) which is fastened to the guide carriage (25).

6. Linear guide according to claim 5, wherein the housing (27) for the exciter block (28) is arranged on a face of the guide carriage (26) pointing in a direction of travel.

7. Linear guide according to claim 1, wherein the measuring head (30) of the distance-measuring system is arranged in a housing (29) which is fastened on the guide carriage (26) on a face pointing in a direction of travel.

8. Linear guide comprising a guide rail (25) on which a guide carriage (26) is supported for movement longitudinally, and a drive to cause the longitudinal movement of the guide carriage (26), the drive being formed as an electric motor with a first motor element arranged on the guide rail (25) and a second motor element arranged on the guide carriage (26), and a distance-measuring system on the linear guide, which includes a measuring strip (31) and a measuring head (30) movable relative to the measuring strip adjacent to the guide carriage (26) or the guide rail (25) and extending parallel to the guide rail (25), wherein the distance-measuring system includes an acceleration sensor having an eddy current sheet and an exciter block (28) surrounding at least a portion thereof, the acceleration sensor is a sensor operating according to the Ferraris principle, and the eddy current sheet is formed of a non-magnetizable metal, and the eddy current sheet function is performed by a rotating disk which is drivable by the guide rail.

9. Linear guide comprising a guide rail arranged in a guide housing (35) on which a traveling carriage is supported for movement longitudinally, and with a drive to cause the longitudinal movement of the traveling carriage (36), the drive being formed as an electric motor with a first motor element arranged on the guide rail and a second motor element arranged on the traveling carriage (36), and a distance-measuring system allocated to the linear guide, the distance-measuring system including an acceleration sensor with an eddy current sheet (41) and an exciter block (42) operating according to the Ferraris principle, whereby the eddy current sheet (41) is made of an electrically conducting, non-magnetizable material and the exciter block (42) includes permanent magnets, and whereby the eddy current sheet (41) is part of a beam having a U-shaped cross section which forms a cable channel (39) for a drag chain (38).

10. Linear guide according to claim 9, wherein the beam (40) is fastened on a longitudinal side of the guide housing (35).

11. Linear guide according to claim 9, wherein the exciter block (42) is constructed U-shaped in cross section and the eddy current sheet (41) is partially surrounded by the exciter block (42).

12. Linear guide according to claim 9, wherein the exciter block (42) is held by a driver strap (43) which is fastened on a longitudinal side of the traveling carriage (38).

13. Linear guide according to claim 9, wherein the eddy current sheet (41) is made of aluminum.

14. Linear guide according to claim 9, wherein the eddy current sheet (41) is made of copper.

* * * * *